United States Patent [19]

Nakamura

[11] Patent Number: 5,246,891
[45] Date of Patent: Sep. 21, 1993

[54] LIGHT-WEIGHT OPTICAL GLASS OF FLUORO-PHOSPHATE

[75] Inventor: Hiroshi Nakamura, Yokohama, Japan

[73] Assignee: Nikon Corporation, Tokyo, Japan

[21] Appl. No.: 924,579

[22] Filed: Aug. 5, 1992

Related U.S. Application Data

[63] Continuation of Ser. No. 692,904, Apr. 29, 1991, abandoned.

[30] Foreign Application Priority Data

May 7, 1990 [JP] Japan ................. 2-117386

[51] Int. Cl.$^5$ ............................. C03C 3/247
[52] U.S. Cl. .......................... 501/44; 501/48; 501/902
[58] Field of Search ............. 501/44, 902, 48

[56] References Cited

U.S. PATENT DOCUMENTS

| | | | |
|---|---|---|---|
| 4,225,459 | 9/1980 | Faulstich et al. | 501/44 |
| 4,363,879 | 12/1982 | Broemer et al. | 501/44 |
| 4,427,784 | 1/1984 | Nakamura et al. | 501/44 |
| 4,857,487 | 8/1989 | Broemer et al. | 501/44 |

FOREIGN PATENT DOCUMENTS 54-34768 10/1979 Japan.
57-44618 9/1982 Japan.
59-83960 5/1984 Japan.
1-270537 10/1989 Japan.
1405717 4/1973 United Kingdom.

*Primary Examiner*—Karl Group
*Attorney, Agent, or Firm*—Shapiro and Shapiro

[57] ABSTRACT

An optical glass has fluorine ion $F^-$ and oxygen ion $O^{2-}$ as anions. The cations in the glass expressed in terms of fluorides and mol % have the following preferred composite range:

| | |
|---|---|
| $PF_5$ | 5.0–30.0% |
| $AlF_3$ | 19.0–40.0% |
| $CaF_2$ | 28.0–56.0% |
| $MgF_2$ | 0–20.0% |
| $SrF_2$ | 0–9.0% |
| $BaF_2$ | 0–18.0% |
| $ZnF_2$ | 0–10.0% |
| $YF_3$ | 0–13.0% |
| $LaF_3$ | 0–7.0% |

The $F^-/O^{2-}$ ratio (the ratio of the number of fluorine ions to the number of oxygen ions) in the glass is in the range of 1.4 - 13.0. The specific gravity of glass is not more than 3.6.

6 Claims, No Drawings

LIGHT-WEIGHT OPTICAL GLASS OF FLUORO-PHOSPHATE

This is a continuation of application Ser. No. 692,904 filed Apr. 29, 1991, now abandoned.

BACKGROUND OF THE INVENTION

1. Field of the Invention

The present invention relates to a lightweight optical glass of fluoro-phosphate that has specific gravity not more than 3.6 with the optical constants converting refractive index nd=1.42–1.50 and Abbe number νd=80–97.

The fluoro-phosphate optical glass under the present invention has significant optical importance as it has extraordinary ray dispersibility and makes it possible to revise the secondary spectrum at the time of lens designing, and also offers high value use as lens material for large diameter camera and television camera lenses.

2. Related Background Art

Crystalline fluorspar ($CaF_2$) has been known as the optical material having extraordinary ray dispersibility and light weight, and its optical constants and specific gravity are as follows:

nd=1.4388
νd=95.3
Sg=3.18

Fluorspar, however, has disadvantages in connection with cleavage and fragility. Moreover, in the face of recent increasing requirements of large diameter lenses, it is difficult to obtain large lumps of fluorspar of homogenous quality and they are very expensive if found.

Thus, various kinds of fluoro-phosphate optical glass as optical material to replace fluorspar have been developed (ref. Japanese Publication No. 54-34768, Japanese Laid-Open Patent Appln. No. 1-270537 and Japanese Publication No. 57-44618), and some of them are available in the market under the nomenclatures of FK01, FCD1, FK02, FCD10 and CaFK95.

However, those conventional glasses have large specific gravity as compared with fluorspar and are not quite desirable for use as optical material for optical apparatus having large diameter lenses.

Also, an invention under Japanese Publication No. 57-44618 requires addition of Si as the indispensable ingredient to improve stability against devitrification and increase viscosity in the molding process. However, if Si is contained in the glass, it often causes devitrification with Si as crystalline nuclear in the pressing process for forming a large size lens, making it very difficult to obtain large diameter lenses.

SUMMARY OF THE INVENTION

Therefore, the present invention has, as a principal object, to overcome the above-mentioned problems and thus to provide a light-weight fluoro-phosphate optical glass that has specific gravity of not more than 3.6, a refractive index nd in the range of 1.42–1.50, an Abbe number νd in the range of 80–97, extraordinary ray dispersibility, high processability, and enough stability against devitrification to make industrial scale production of large diameter lenses possible.

As will be appreciated hereinafter, such a glass may contain fluorine ion F and oxygen ion $O^{2-}$ as anions, and cations as are expressed in terms of mol % of fluoride as follows:

| | |
|---|---|
| $PF_5$ | 5.0–30.0% |
| $AlF_3$ | 19.0–40.0% |
| $CaF_2$ | 28.0–56.0% |
| $MgF_2$ | 0–20.0% |
| $SrF_2$ | 0–9.0% |
| $BaF_2$ | 0–18.0% |
| $ZnF_2$ | 0–10.0% |
| NaF | 0–4.0% |
| KF | 0–4.0% |
| $YF_3$ | 0–13.0% |
| $LaF_3$ | 0–7.0% | with $F^-/O^{2-}$ ratio (the ratio of fluorine ion number against oxygen ion number) being in the range of 1.4–13.0 and with the specific gravity less than 3.6.

While glass covered by this invention basically consists of P-Al-Ca-F-O glass, the present invention is characterised, interalia, in that the target lightweight glass is obtained by having found a range of glassification where a lot more Ca is constained than in the conventional fluoro-phosphate optical glass.

Stated in the following are the reasons for which the composite range of respective ingredients has been so determined:

$P_2O_5$, phosphoric ingredient, present in glass, acts as glass forming oxidant to stabilize glass structure or improve stability against devitrification. An amount of $PF_5$ less than 5.0 mol % does not give the said effect and in excess of 30.0 mol % enhances dispersion too much to obtain the targeted optical constants.

$AlF_3$ gives good effect on lowering the temperature at which devitrification occurs and stabilization of glass, and is indispensable in the range of 19.0–40.0 mol % in order to further improve chemical stability. Any amount in deviation of the said range fails to give stability of glass against devitrification.

Fluorides of alkaline earth metals with low atomic numbers are effective in decreasing dispersibility and at the same time reducing specific gravity. $CaF_2$ in particular is indispensable as it increases viscosity. As for its amount, 28.0 mol % or less is not effective enough and 56.0 mol % or more causes devitrification to occur.

The $F^-/O^{2-}$ ratio or the ratio of the number of fluorine ions against oxygen ion numbers has large influence on stability of glass against dispersion and devitrification. If the ratio is less than 1.4, dispersion gets too large, while if it is in excess of 13.0, the devitrification tends to be greater.

The P-Al-Ca-F-O material makes it possible to obtain the target optical glass, but it is possible by adding suitable amounts of other ingredients to enhance the optical constants, make the glass lighter and improve the stability against devitrification.

Addition of $MgF_2$ reduces specific gravity and dispersion of glass, but if it is in excess of 20.0 mol % devitrification tends to increase.

$SrF_2$ and $BaF_2$ are effective in improving stability against devitrification. But too much makes the specific gravity of the glass high, so $SrF_2$ should be used in an amount of not more than 9.0 mol % and $BaF_2$ not more than 18 mol %.

Addition of ZnF may increase stability against devitrification in certain cases. Its addition in excess of a proper amount makes it impossible to obtain the necessary low dispersion. So, its amount should be limited to not more than 10 mol %.

Addition of alkaline metal fluoride lowers the melting point of glass to make glassification easy, but its overaddition lowers viscosity to make it difficult to obtain a large diameter lens of homogenous quality. Therefore, NaF and KF can be added up to 4.0 mol %. LiF should not be used as it spoils stability against devitrification for a large diameter lens.

Addition of small amounts of $YF_3$ or rare earth elements, such as $LaF_3$, contributes to improved chemical durability and stability against devitrification, and also broadens the optical characteristics. As its excessive use tends to promote devitrification. $YF_3$ should be used in an amount not more than 13.0 mol %, and $LaF_3$ not more than 7.0 mol %. $NdF_3$ is not a suitable material for use, because it colors glass.

Coming under the above range of composition, the glass in which the composite ranges for $PF_5$, NaF and KF in particular are, in terms of mol %,

|  |  |
|---|---|
| $PF_5$ | 8.0–30.0% |
| NaF | 0 |
| KF | 0. | and the $F^-/O^{2-}$ ratio (the ratio of fluorine ion number against oxygen ion number) is in the range of 1.4–9.0, has high viscosity at molding time and is suitable for the purpose of obtaining a large diameter lens.

When, in addition, the ranges of composition of $MgF_2$ and $BaF_2$ are, in terms of mol %,

|  |  |
|---|---|
| $MgF_2$ | 0.5–20.0% |
| $BaF_2$ | 0–13.0% |

The glass has specific gravity not more than 3.55 and is lighter in weight than glasses having the other compositions.

When, still further, the ranges of composition of $AlF_3$ and $CaF_2$ are, in terms of mol %,

|  |  |
|---|---|
| $AlF_3$ | 20.0–36.0% |
| $CaF_2$ | 28.0–48.0% |

The glass is more stable against devitrification.

In the case of manufacturing glass covered by this invention, $H_3PO_4$ $P_2O_5$ and other metal phosphates can be used. Usually it is recommendable to use metaphosphates of alkaline metals, alkaline earth metals, or aluminum.

As to other ingredients, normally, metal fluorides containing composite cations are used as raw material, but oxidized metals and oxides of metal can also be used provided that the $F^-/O^{2-}$ carbonates ratio of glass remains in the given range.

It is also possible to use minor amounts of metal-chlorides, -bromides, -iodides, etc. containing the said composite cations as raw material.

Also, such metal elements as As, Sb, Ti, Pb, Zr, Yb, Gd, Ce and the like may be contained in the glass respectively up to 4 mol % as far as fluorides, complex salt of fluorine and oxides of those elements are added as raw materials. By so doing, it is possible to improve solarization of glass and diversify its optical characteristics.

Furthermore, the glass in which the weight content of impurity transition metal elements, particularly the elements of Cr, Mn, Fe, Co, Nl and Cu, is controlled to be not more than 3 ppm in total, gives such a high light transmissivity in the ultra violet range as more than 80% at 250 nm (10 mm transmissivity).

DETAILED DESCRIPTION OF THE PREFERRED EMBODIMENTS

The following Table 1 shows compositional data (in mol %) for examples No. 1 through No. 27 of the optical glass of the present invention. The refractive index nd, Abbe number νd and the specific gravity Sg are also shown for each example. In the said Table 1, there is a section showing the composite fluorides for each example and a section showing the corresponding raw materials, both in terms of mol %.

Table 2 compares the specific gravities of fluorophosphate optical glass available in the market with those of glass coming under this invention and almost identical to the former in optical constants.

The glass of the present invention can be manufactured, for example, by taking the raw materials stated in Table 1 at the desired ratio, mixing them, melting them in a platinum crucible in an electric furnace operated under a temperature of 900°–1100° C., allowing clarification, agitating, homogenizing, casting and cooling down gradually.

As mentioned above, the present invention makes it possible to obtain, on an industrial production scale, such light-weight fluoro-phosphate optical glass that is as light as 3.6 and less in specific gravity (always lightest among glasses with the same optical constants), and that has a refractive index nd 1.42–1.50, an Abbe number νd in the range of 80–97, extraordinary ray dispersibility, good processability, and stability against devitrification when used in making large diameter lenses.

TABLE 1

| Ingredients | No. 1 % | No. 2 % | No. 3 % |
|---|---|---|---|
| Composite fluorides |  |  |  |
| $PF_5$ | 16.7 | 13.8 | 16.7 |
| $AlF_3$ | 29.2 | 28.4 | 29.2 |
| $MgF_2$ |  | 1.7 | 9.2 |
| $CaF_2$ | 54.1 | 56.0 | 45.0 |
| $SrF_2$ |  |  |  |
| $BaF_2$ |  |  |  |
| $F^-/O^{2-}$ | 3.6 | 4.5 | 3.6 |
| Raw materials stated |  |  |  |
| $Al(PO_3)_3$ |  |  |  |
| $Mg(PO_3)_2$ |  |  |  |
| $Ca(PO_3)_2$ | 10 | 8 | 10 |
| $AlF_3$ | 35 | 33 | 35 |
| $MgF_2$ |  | 2 | 11 |
| $CaF_2$ | 55 | 57 | 44 |
| $SrF_2$ |  |  |  |
| $BaF_2$ |  |  |  |
| nd | 1.45908 | 1.44748 | 1.45380 |
| νd | 88.6 | 90.4 | 88.9 |
| Sg. | 3.12 | 3.12 | 3.11 |
| Ingredients | No. 4 % | No. 5 % | No. 6 % |
| Composite fluorides |  |  |  |
| $PF_5$ | 28.6 | 16.7 | 16.7 |
| $AlF_3$ | 20.7 | 27.5 | 29.2 |
| $MgF_2$ | 2.1 |  |  |
| $CaF_2$ | 47.1 | 47.5 | 41.6 |
| $SrF_2$ |  |  |  |
| $BaF_2$ |  | 8.3 | 12.5 |
| $F^-/O^{2-}$ | 1.5 | 3.6 | 3.6 |
| Raw materials stated |  |  |  |
| $Al(PO_3)_3$ |  |  |  |

TABLE 1-continued

| Ingredients | No. 4 (cont.) | No. 5 (cont.) | No. 6 (cont.) |
|---|---|---|---|
| $Mg(PO_3)_2$ | | | |
| $Ca(PO_3)_2$ | 20 | 10 | 10 |
| $AlF_3$ | 29 | 33 | 35 |
| $MgF_2$ | 3 | | |
| $CaF_2$ | 46 | 47 | 40 |
| $SrF_2$ | | | 15 |
| $BaF_2$ | | 10 | |
| nd | 1.49611 | 1.46730 | 1.47061 |
| νd | 80.6 | 87.3 | 87.1 |
| Sg | 3.10 | 3.36 | 3.47 |

| Ingredients | No. 7 % | No. 8 % | No. 9 % |
|---|---|---|---|
| Composite fluorides | | | |
| $PF_5$ | 19.1 | 15.4 | 23.1 |
| $AlF_3$ | 34.1 | 23.1 | 32.3 |
| $MgF_2$ | | | |
| $CaF_2$ | 38.2 | 38.5 | 28.5 |
| $SrF_2$ | 8.6 | 7.7 | 6.9 |
| $BaF_2$ | | 7.7 | 9.2 |
| $F^-/O^{2-}$ | 3.0 | 3.5 | 2.4 |
| Raw materials stated | | | |
| $Al(PO_3)_3$ | 7 | | 10 |
| $Mg(PO_3)_2$ | | | |
| $Ca(PO_3)_2$ | | 10 | |
| $AlF_3$ | 30.5 | 30 | 32 |
| $MgF_2$ | | | |
| $CaF_2$ | 42 | 40 | 37 |
| $SrF_2$ | 9.5 | 10 | 9 |
| $BaF_2$ | | 10 | 12 |
| nd | 1.46023 | 1.47328 | 1.47781 |
| νd | 88.6 | 86.6 | 86.0 |
| Sg | 3.23 | 3.48 | 3.46 |

| Ingredients | No. 10 % | No. 11 % | No. 12 % |
|---|---|---|---|
| Composite fluorides | | | |
| $PF_5$ | 25.4 | 16.7 | 15.3 |
| $AlF_3$ | 22.4 | 29.2 | 39.0 |
| $MgF_2$ | | 3.3 | |
| $CaF_2$ | 38.1 | 45.0 | 28.0 |
| $SrF_2$ | 7.5 | | 2.5 |
| $BaF_2$ | 6.7 | 5.8 | 15.3 |
| $F^-/O^{2-}$ | 1.9 | 3.6 | 4.2 |
| Raw materials stated | | | |
| $Al(PO_3)_3$ | | | 6 |
| $Mg(PO_3)_2$ | | | |
| $Ca(PO_3)_2$ | 17 | 10 | |
| $AlF_3$ | 30 | 35 | 40 |
| $MgF_2$ | | 4 | |
| $CaF_2$ | 34 | 44 | 33 |
| $SrF_2$ | 10 | | 3 |
| $BaF_2$ | 9 | 7 | 18 |
| nd | 1.49222 | 1.46191 | 1.46020 |
| νd | 82.2 | 88.0 | 90.7 |
| Sg | 3.40 | 3.28 | 3.56 |

| Ingredients | No. 13 % | No. 14 % | No. 15 % |
|---|---|---|---|
| Composite fluorides | | | |
| $PF_5$ | 10.7 | 13.0 | 8.3 |
| $AlF_3$ | 31.3 | 30.4 | 35.5 |
| $MgF_2$ | 5.4 | 20.0 | 8.5 |
| $CaF_2$ | 34.8 | 28.7 | 33.0 |
| $SrF_2$ | | 7.8 | 5.5 |
| $BaF_2$ | 17.9 | | 5.5 |
| KF | | | 3.7 |
| $F^-/O^{2-}$ | 6.2 | 4.9 | 8.3 |
| Raw materials stated | | | |
| $Al(PO_3)_3$ | | 5 | 1.7 |
| $Mg(PO_3)_2$ | | | |
| $Ca(PO_3)_2$ | 6 | | |
| $AlF_3$ | 35 | 30 | 37 |
| $MgF_2$ | 6 | 23 | 9.3 |
| $CaF_2$ | 33 | 33 | 36 |
| $SrF_2$ | | 9 | 6 |
| $BaF_2$ | 20 | | 6 |
| $KPO_3$ | | | 4 |
| nd | 1.45851 | 1.43722 | 1.43538 |
| νd | 90.1 | 92.3 | 93.6 |
| Sg | 3.60 | 3.21 | 3.32 |

| Ingredients | No. 16 % | No. 17 % | No. 18 % |
|---|---|---|---|
| Composite fluorides | | | |
| $PF_5$ | 19.4 | 16.7 | 9.1 |
| $AlF_3$ | 25.8 | 29.2 | 38.1 |
| $MgF_2$ | 8.1 | | 3.6 |
| $CaF_2$ | 29.0 | 45.0 | 34.5 |
| $SrF_2$ | 3.2 | | 5.5 |
| $BaF_2$ | 4.8 | 5.8 | 9.1 |
| | $ZnF_2$ 9.7 | NaF 3.3 | |
| $F^-/O^{2-}$ | 2.9 | 3.5 | 7.7 |
| Raw materials stated | | | |
| $Al(PO_3)_3$ | | | |
| $Mg(PO_3)_2$ | | | |
| $Ca(PO_3)_2$ | | 10 | 5 |
| $AlF_3$ | 32 | 35 | 42 |
| $MgF_2$ | 10 | | 4 |
| $CaF_2$ | 36 | 44 | 33 |
| $SrF_2$ | 4 | | 6 |
| $BaF_2$ | 6 | 7 | 10 |
| | $Zn(PO_3)_2$ 12 | NaF 4 | |
| nd | 1.47461 | 1.46030 | 1.44840 |
| νd | 81.9 | 87.8 | 93.3 |
| Sg | 3.38 | 3.27 | 3.45 |

| Ingredients | No. 19 % | No. 20 % | No. 21 % |
|---|---|---|---|
| Composite fluorides | | | |
| $PF_5$ | 10.7 | 17.4 | 8.3 |
| $AlF_3$ | 34.8 | 26.4 | 32.1 |
| $MgF_2$ | 4.5 | 8.3 | 1.8 |
| $CaF_2$ | 42.0 | 37.2 | 45.4 |
| $SrF_2$ | 5.4 | 8.3 | 6.4 |
| $BaF_2$ | 2.7 | 2.5 | 6.0 |
| $F^-/O^{2-}$ | 6.3 | 3.3 | 8.4 |
| Raw materials stated | | | |
| $Al(PO_3)_3$ | 4 | 7 | |
| $Mg(PO_3)_2$ | | | |
| $Ca(PO_3)_2$ | | | 4.5 |
| $AlF_3$ | 35 | 25 | 35 |
| $MgF_2$ | 5 | 10 | 2 |
| $CaF_2$ | 47 | 45 | 45 |
| $SrF_2$ | 6 | 10 | 7 |
| $BaF_2$ | 3 | 3 | 6.5 |
| nd | 1.44016 | 1.46002 | 1.44556 |
| νd | 92.1 | 88.0 | 92.9 |
| Sg | 3.26 | 3.30 | 3.41 |

| Ingredients | No. 22 % | No. 23 % | No. 24 % |
|---|---|---|---|
| Composite fluorides | | | |
| $PF_5$ | 8.3 | 5.7 | 19.4 |
| $AlF_3$ | 35.7 | 35.8 | 21.8 |
| $MgF_2$ | 1.8 | 9.4 | 9.7 |
| $CaF_2$ | 36.7 | 37.7 | 32.3 |
| $SrF_2$ | 4.6 | 6.6 | 6.5 |
| $BaF_2$ | 12.8 | 4.7 | 4.0 |
| $YF_3$ | | | 6.5 |
| $F^-/O^{2-}$ | 8.5 | 12.9 | 2.9 |
| Raw materials stated | | | |
| $Al(PO_3)_3$ | 3 | 2 | |
| $Mg(PO_3)_2$ | | | 12 |
| $Ca(PO_2)_2$ | | | |
| $AlF_3$ | 36 | 36 | 27 |
| $MgF_2$ | 2 | 10 | |
| $CaF_2$ | 40 | 40 | 40 |
| $SrF_2$ | 5 | 7 | 8 |
| $BaF_2$ | 14 | 5 | 5 |

TABLE 1-continued

| | | | |
|---|---|---|---|
| YF₃ | | | 8 |
| nd | 1.44777 | 1.42948 | 1.47717 |
| νd | 92.5 | 96.2 | 85.1 |
| Sg. | 3.55 | 3.35 | 3.44 |
| Ingredients | No. 25 % | No. 26 % | No. 27 % |
| Composite fluorides | | | |
| PF₅ | 19.4 | 19.5 | 19.4 |
| AlF₃ | 20.2 | 19.5 | 28.2 |
| MgF₂ | 9.7 | 9.8 | 4.0 |
| CaF₂ | 36.3 | 36.6 | 46.0 |
| SrF₂ | 5.6 | 2.4 | 4.0 |
| BaF₂ | | | |
| | YF₃ 8.9 | YF₃ 12.2 | LaF₃ 6.5 |
| F⁻/O²⁻ | 2.9 | 3.0 | 3.3 |
| Raw materials stated | | | |
| Al(PO₃)₃ | | | |
| Mg(PO₃)₂ | 12 | 12 | |
| Ca(PO₂)₂ | | | |
| AlF₃ | 25 | 24 | 35 |
| MgF₂ | | | 5 |
| CaF₂ | 45 | 45 | 45 |
| SrF₂ | 7 | 3 | 5 |
| BaF₂ | | | |
| | YF₃ 11 | YF₃ 15 | LaF₃ 8 |
| nd | 1.47819 | 1.48120 | 1.47628 |
| νd | 84.6 | 83.8 | 85.3 |
| Sg. | 3.36 | 3.37 | 3.38 |

TABLE 2

(Comparision of specific gravity)

| Physical property | Glass in market | | Implementation No. 10 of this Invention |
|---|---|---|---|
| | FK01 | FK01 | |
| nd | 1.49700 | 1.49700 | 1.49222 |
| νd | 81.6 | 81.6 | 82.2 |
| Sg. | 3.60 | 3.63 | 3.40 |
| Physical property | Glass in market | | Implementation No. 2 of this Invention |
| | FK02 | FCD10 | |
| nd | 1.45600 | 1.45650 | 1.44748 |
| νd | 90.3 | 90.8 | 90.4 |
| Sg. | 3.55 | 3.63 | 3.12 |
| Physical property | Glass in market | | Implementation No. 23 of this Invention |
| | CaFK95 | | |
| nd | 1.43425 | | 1.42948 |
| νd | 95.0 | | 96.2 |
| Sg. | 3.55 | | 3.35 |

What is claimed is:

1. A light-weight fluorophosphate optical glass which contains fluorine ion F and oxygen ion $O^{2-}$ as anions and which is free of Si, Nd, Na, and K, the glass also having the following composition ranges of cations, expressed in terms of fluorides in mol %.

| | |
|---|---|
| PF₅ | 5.0–30.0% |
| AlF₃ | 19.0–34.1% |
| CaF₂ | 28.0–56.0% |
| MgF₂ | 0–20.0% |
| SrF₂ | 0–9.0% |
| BaF₂ | 0–18.0% |
| ZnF₂ | 0–10.0% |
| YF₃ | 0–13.0% |
| LaF₃ | 0–7.0% | and further having a ratio of the number of fluorine ions $F^-$ to the number of oxygen ions $O^{2-}$ in the range of 1.4–13.0, a specific gravity of not more than 3.6, an index of refraction nd in the range of 1.42–1.50, and an Abbe number νd in the range of 80–97.

2. A glass according to claim 1 that has the following composition range of PF₅, in terms of mol %, PF₅ 8.0–30.0% and also having a ratio of the number of fluoride ions $F^-$ to the number of oxygen ions $O^{2-}$ in the range of 1.4–9.0.

3. A glass according to claim 2 that has the following composition range of MgF₂ and BaF₂, in terms of mol %,

| | |
|---|---|
| MgF₂ | 0.5–20.0% |
| BaF₂ | 0–13.0% |

4. A glass according to claim 3 that has the following composite range of AlF₃ and CaF₂, in terms of mol %.

| | |
|---|---|
| AlF₃ | 20.0–34.1 |
| CaF₂ | 28.0–48.0 |

5. A glass according to claim 1, wherein the ratio, in mol, (MgF₂+CaF₂)/AlF₃ is substantially equal to or greater than 1.12.

6. A lens made of the glass according to claim 1.

* * * * *